Figure 1:
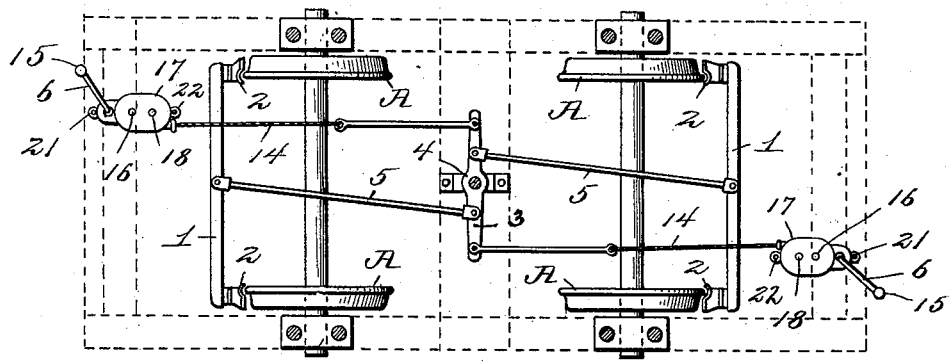

No. 686,643. Patented Nov. 12, 1901.
W. WINKLER.
VEHICLE BRAKE MECHANISM.
(Application filed July 9, 1900.)
(No Model.)

Witnesses
H. L. Amer
B. F. Funk

Inventor
William Winkler.
By
Victor J. Evans
Attorney

THE NORRIS PETERS CO., PHOTO-LITHO., WASHINGTON, D. C.

UNITED STATES PATENT OFFICE.

WILLIAM WINKLER, OF SYRACUSE, NEW YORK.

VEHICLE BRAKE MECHANISM.

SPECIFICATION forming part of Letters Patent No. 686,643, dated November 12, 1901.

Application filed July 9, 1900. Serial No. 22,895. (No model.)

*To all whom it may concern:*

Be it known that I, WILLIAM WINKLER, of Syracuse, in the county of Onondaga, in the State of New York, have invented new and useful Improvements in Vehicle Brake Mechanism, of which the following, taken in connection with the accompanying drawings, is a full, clear, and exact description.

My invention relates to improvements in brake mechanism for vehicles, and particularly for railway-cars, and has for its object the production of a simple and practical device which may be readily and economically connected to the ordinary shoe-supporting bars and the operating member of a street-car and which is adapted to quickly and positively stop the car within a short distance when running at a high rate of speed. To this end the invention consists in the combination, construction, and arrangement of the parts of a brake mechanism, as hereinafter fully described and claimed.

In describing this invention reference is had to the accompanying drawings, forming a part of this specification, in which similar reference characters indicate corresponding parts in all the views.

Figure 2:
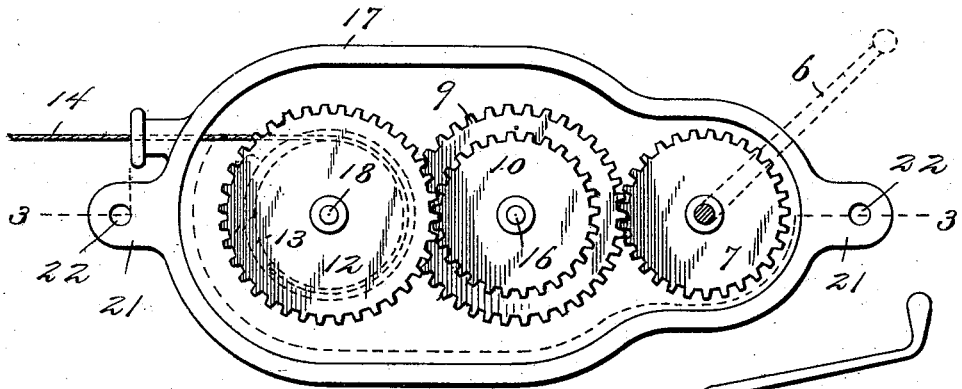
Figure 3:
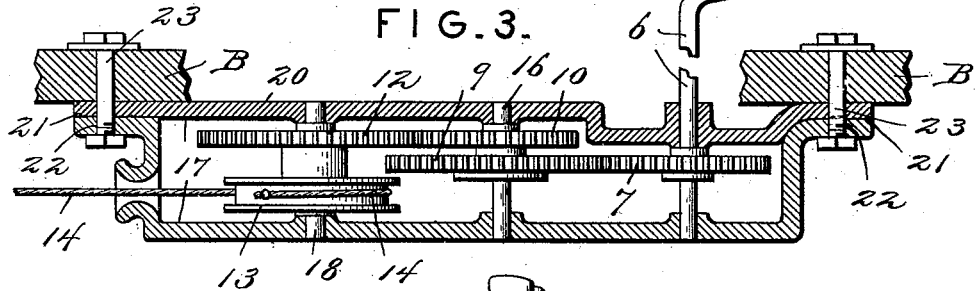
Figure 4:
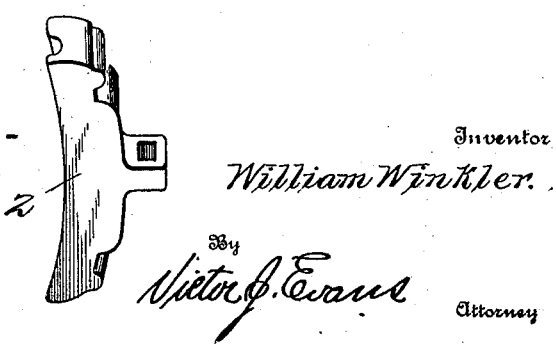

Figure 1 is a plan view of an ordinary street-car truck, showing the application of my invention thereto. Fig. 2 is an enlarged top plan of my invention, shown as operatively mounted in a suitable supporting-case, the upper wall of said case being removed for disclosing the interior mechanism. Fig. 3 is a sectional view taken on line 3 3, Fig. 2. Fig. 4 is an isometric view of one of the detached brake-shoes.

As preferably constructed this brake mechanism consists of brake-bars 11, arranged at the opposite ends of the car and provided with brake-shoes 2 for engaging the outer peripheral faces of the wheels, as A.

3 is a lever interposed between the bars 1 and is pivoted at 4 in the usual manner to the frame B of the car-truck.

5 5 represent connecting bars or links having corresponding ends connected to the lever 3 on opposite sides of the pivot 4 and its opposite ends connected to the brake-bars 1.

The means for actuating the lever 3 consists of an operating member 6 and suitable gears and drum, of which 7 represents a pinion secured to the operating member 6.

9 is a gear meshing with the pinion 7 and provided with a pinion 10, secured thereto in any desired manner.

The gear 9 is preferably formed of greater diameter than the pinion 7 in order to increase the power transmitted from the pinion 7. The pinion 10 is formed of less diameter than the gear 9 and is arranged to mesh with a gear 12, which is provided with a drum 13. The gear 12 is formed of greater diameter than the pinion 10 meshing therewith in order to transmit an increased power to said gear 12. As shown in the drawings, the pinions 7 and 10 are of substantially the same diameter and the gears 9 and 12 are formed of equal diameter, and it is thus apparent that by applying power to rotate the pinion 7 an increased power is transmitted to the gear 12 in a ratio proportionate to the difference of the diameters of the several gears 7, 9, 10, and 12.

14 represents a cable having one end secured to the drum 13 and its other end connected to one end of the lever 3, preferably at the outside of the connection between the links 5 with said lever 3.

The operating member usually consists of a substantially vertical shaft of the ordinary construction, which is journaled in the usual manner in proximity to the platform of the car, and is provided with a crank arm or handle 15, which may also be of any ordinary construction, for rotating the pinion 7.

I preferably provide each end of the car with the above-described system of gearing and drums in order that the brake may be operated from either end of said car.

The cable 14 may be of any desired construction, as a chain, wire cable, or other equivalent, and is so connected to the drum 13 as to move in substantially the same direction as said drum.

As previously stated, the gear 9 and pinion 10 are secured to each other and revolve in the same direction and are preferably mounted on a spindle 16, either journaled or otherwise secured in a suitable casing 17. The gear 12 and drum 13 are also secured to each other and are mounted upon a suitable spindle 18, also journaled or otherwise secured in the casing 17. The lower end of the operating member 6 is also journaled in the casing 17, and it is evident from the foregoing description and by reference to Figs. 2 and 3 that when the operating member is rotated in one direction motion is transmitted to the gears 9, 10, and 12 from the pinion 7 and that motion is also transmitted from the drum 13 to the cable 14, which in turn operates the lever 3, and thereby forces the brake-shoes 2 into engagement with the wheels A of the car. When the operating member 6 is rotated in the reverse direction, it is evident that the cable 14 is slackened, thereby releasing the brake-shoes from engagement with the wheels A, said brake-shoes being automatically forced away from said wheels either by gravity or a suitable spring. (Not illustrated.)

The above-described gearing and drum are inclosed within the casing 17, said casing being provided with a removable wall 20 and with projecting ears or lugs 21, which are formed with apertures 22 for receiving clamping-bolts 23, the clamping-bolts serving to secure the casing 17 to the adjacent portion of the truck B of the car.

The operation of my invention will now be readily understood upon reference to the foregoing description and the accompanying drawings, and it will be noted that the main object sought is to move the brake-shoes quickly and positively into engagement with the wheels of the truck with but a slight movement of the operating member 6 and to also provide means connected to the operating member for increasing the power of engagement of said brake-shoes with the wheels of the truck over the power applied to the operating member and that the means for carrying out these objects may be considerably varied without departing from the spirit of this invention.

Changes may be made in the detail construction and arrangement of the parts of this invention without departing from the spirit thereof. Therefore I do not limit myself to the precise construction and arrangement shown and described.

Having thus fully described my invention, what I claim as new, and desire to secure by Letters Patent, is—

A brake-operating mechanism comprising a casing, an operating outer shaft carrying a pinion, an intermediate shaft carrying a gear-wheel meshed by the pinion on the outer shaft and also carrying a pinion, an inner shaft carrying a gear-wheel meshed by the pinion on the intermediate shaft and also carrying a drum, and a flexible connection secured to the drum on the inner shaft and connected with the brake.

In witness whereof I have hereunto set my hand this 2d day of July, 1900.

WILLIAM WINKLER.

Witnesses:
HOWARD P. DENISON,
H. E. CHASE.